US009895941B2

(12) United States Patent
Bill

(10) Patent No.: US 9,895,941 B2
(45) Date of Patent: Feb. 20, 2018

(54) AIRCRAFT TIRE PRESSURE MONITORING SYSTEM

(71) Applicant: Airbus Operations Limited, Bristol (GB)

(72) Inventor: Andrew Raymond Bill, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 15/280,529

(22) Filed: Sep. 29, 2016

(65) Prior Publication Data

US 2017/0087943 A1    Mar. 30, 2017

(30) Foreign Application Priority Data

Sep. 29, 2015  (GB) .................................. 1517164.8

(51) Int. Cl.
| | | |
|---|---|---|
| *B60C 23/00* | (2006.01) | |
| *B60C 23/04* | (2006.01) | |
| *G07C 5/00* | (2006.01) | |
| *B64F 5/00* | (2017.01) | |
| *B64D 45/00* | (2006.01) | |

(52) U.S. Cl.
CPC ...... *B60C 23/0405* (2013.01); *B60C 23/0476* (2013.01); *B60C 23/0484* (2013.01); *B60C 23/0486* (2013.01); *B64D 45/00* (2013.01); *B64F 5/0045* (2013.01); *G07C 5/006* (2013.01)

(58) Field of Classification Search
CPC .................................................. B60C 23/0484
USPC ............................................ 340/442, 426.33
See application file for complete search history.

(56) References Cited

U.S. PATENT DOCUMENTS

| | | | |
|---|---|---|---|
| 3,900,828 A | 8/1975 | Lage et al. | |
| 4,224,597 A | 9/1980 | DiCecio | |
| 4,283,707 A | 8/1981 | Church | |
| 4,355,298 A | 10/1982 | Jessup | |

(Continued)

FOREIGN PATENT DOCUMENTS

| | | |
|---|---|---|
| EP | 0 036 755 | 9/1981 |
| EP | 3 069 904 | 9/2016 |

OTHER PUBLICATIONS

European Search Report cited in EP 16 19 0837 completed Feb. 2, 2017, seven pages.

*Primary Examiner* — Kevin Kim
(74) *Attorney, Agent, or Firm* — Nixon & Vanderhye P.C.

(57) ABSTRACT

A monitoring system, having a processor, provides pressure warnings associated with a tire of an aircraft When the aircraft is stationary, the processor operates in a maintenance mode and receives a first pressure measurement indicating a pressure of the tire; compares the first pressure measurement with a maintenance mode low pressure threshold, and causes the flight deck display to display a low pressure warning associated if the first pressure measurement is below the maintenance mode low pressure threshold. When the aircraft is in motion, the processor operates in a flight mode and receives a second pressure measurement indicating a pressure of the tire, compares the second pressure measurement with an abnormal pressure threshold which is lower than the maintenance mode low pressure threshold, and causes the flight deck display to display an abnormal pressure warning if the second pressure measurement is below the abnormal pressure threshold.

15 Claims, 2 Drawing Sheets

(56) References Cited

U.S. PATENT DOCUMENTS

| | | |
|---|---|---|
| 2009/0207009 A1 | 8/2009 | Kiesewetter et al. |
| 2014/0095013 A1* | 4/2014 | Wagner ............... B60C 23/0406 701/29.1 |
| 2015/0224831 A1 | 8/2015 | Miller |
| 2015/0231936 A1* | 8/2015 | Keller ................. B60C 23/0406 340/442 |
| 2016/0285300 A1* | 9/2016 | Summers ................ H02J 7/025 |

* cited by examiner

AIRCRAFT TIRE PRESSURE MONITORING SYSTEM

RELATED APPLICATION

This application claims priority to Great Britain Patent Application 1517164.8 filed Sep. 29, 2015, the entirety of which is incorporated by reference.

FIELD OF THE INVENTION

The present invention relates to a monitoring system for providing pressure warnings associated with a tire of an aircraft, and an associated method.

BACKGROUND

U.S. Pat. No. 4,355,298 describes a system to give a warning of a low or flat tire condition to an aircraft crew in the cockpit of the aircraft. The system is able to produce distinct warning signals for more than one distinct dangerous tire condition. For example, it may be desired to produce one warning signal when a tire is only slightly under inflated and to produce a second warning signal when the same tire is greatly under inflated.

U.S. Pat. No. 4,283,707 describes an aircraft low tire pressure sensing and cockpit display and warning system utilizing axle wheel pair comparator circuitry.

A problem with the system of U.S. Pat. No. 4,355,298, and other similar conventional low or flat tire warning systems, is that when the aircraft is in motion a low tire pressure warning signal may be issued even though the pressure of the tire is still sufficiently high for the aircraft to be operated safely. In this case the warning signal is unnecessary and may distract the aircraft crew. It may also prompt the aircraft crew to abort the flight even though the aircraft can still be operated safely.

SUMMARY

The invention disclosed herein may be embodied as a method of operating a monitoring system to provide pressure warnings associated with a tire of an aircraft, the system comprising a flight deck display on a flight deck of the aircraft and a processor, the method comprising: when the aircraft is stationary, operating the processor in a maintenance mode in which the processor receives a first pressure measurement indicating a pressure of the tire; compares the first pressure measurement with a maintenance mode low pressure threshold, and causes the flight deck display to display a low pressure warning associated with the tire if the first pressure measurement is below the maintenance mode low pressure threshold; and when the aircraft is in motion, operating the processor in a flight mode in which the processor receives a second pressure measurement indicating a pressure of the tire, compares the second pressure measurement with an abnormal pressure threshold which is lower than the maintenance mode low pressure threshold, and causes the flight deck display to display an abnormal pressure warning associated with the tire if the second pressure measurement is below the abnormal pressure threshold; wherein when the processor is in the flight mode, if the second pressure measurement is between the maintenance mode low pressure threshold and the abnormal pressure threshold, then the processor does not cause the flight deck display to display a low pressure warning associated with the tire.

The invention may also be embodied as a monitoring system for providing pressure warnings associated with a tire of an aircraft, the system comprising a flight deck display on a flight deck of the aircraft and a processor; wherein the processor is programmed to operate in a maintenance mode when the aircraft is stationary and in a flight mode when the aircraft is in motion; in the maintenance mode, the processor is programmed to compare a first pressure measurement indicating a pressure of the tire with a maintenance mode low pressure threshold, and cause the flight deck display to display a low pressure warning associated with the tire if the first pressure measurement is below the maintenance mode low pressure threshold; in the flight mode, the processor is programmed to compare a second pressure measurement indicating a pressure of the tire with an abnormal pressure threshold which is lower than the maintenance mode low pressure threshold, and cause the flight deck display to display an abnormal pressure warning associated with the tire if the second pressure measurement is below the abnormal pressure threshold; and in the flight mode, the processor is programmed so that if the second pressure measurement is between the maintenance mode low pressure threshold, then the processor does not cause the flight deck display to display a low pressure warning associated with the tire.

The invention may be embodied as a method of operating a monitoring system provides pressure warnings associated with a tire of an aircraft. The monitoring system includes a flight deck display on a flight deck of the aircraft and a processor. When the aircraft is stationary, the processor operates in a maintenance mode in which the processor receives a first pressure measurement indicating a pressure of the tire; compares the first pressure measurement with a maintenance mode low pressure threshold, and causes the flight deck display to display a low pressure warning associated with the tire if the first pressure measurement is below the maintenance mode low pressure threshold. When the aircraft is in motion, the processor operates in a flight mode in which the processor receives a second pressure measurement indicating a pressure of the tire, compares the second pressure measurement with an abnormal pressure threshold which is lower than the maintenance mode low pressure threshold, and causes the flight deck display to display an abnormal pressure warning associated with the tire if the second pressure measurement is below the abnormal pressure threshold. When the processor is in the flight mode, if the second pressure measurement is between the maintenance mode low pressure threshold and the abnormal pressure threshold, then the processor does not cause the flight deck display to display a low pressure warning associated with the tire, so the flight crew is not distracted.

The invention may be configured to provide a solution to the problem of unnecessary low pressure warnings which might distract the flight crew of the aircraft. When the aircraft is in motion (either on the ground or in the air) then the processor operates in a flight mode in which it inhibits or prevents the display of low pressure warnings via the flight deck display, and only causes the flight deck to display an abnormal pressure warning if the tire pressure is dangerously low (that is, below the abnormal pressure threshold). When the aircraft is stationary, then the flight deck display can be used to display low pressure warnings to maintenance crew.

Typically when the processor is in the flight mode and the second pressure measurement is between the maintenance mode low pressure threshold and the abnormal pressure threshold, then no tire pressure warnings associated with the tire are displayed by the flight deck display. When the processor is in the flight mode and a pressure measurement for another tire is below the abnormal pressure threshold, then a tire pressure warning associated with that other tire will be displayed by the flight deck display.

Optionally, the abnormal pressure warning associated with the tire includes an indication that the second pressure measurement is below the abnormal pressure threshold, and also includes at least one item of operational information, such as a braking distance, maximum steering angle or maximum taxi speed. Such operational instructions can assist the flight crew in modifying their procedures to account for the fact that one of the tires has a very low pressure.

Optionally. the processor is programmed to switch between the maintenance mode and the flight mode in response to receiving flight phase information from a flight computer, such as an indication that an engine of the aircraft has been turned on.

Optionally, when the processor is in the flight mode it is programmed to compare the second pressure measurement with a flight mode low pressure threshold which is between the abnormal pressure threshold and the maintenance mode low pressure threshold, and cause a maintenance system to display a low pressure warning associated with the tire if the second pressure measurement is lower than the flight mode low pressure threshold.

When the processor is in the maintenance mode and the first pressure measurement is below the maintenance mode low pressure threshold, then optionally the processor is programmed to not only cause the flight deck display to display a low pressure warning associated with the tire, but also to cause a maintenance system to display a low pressure warning.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
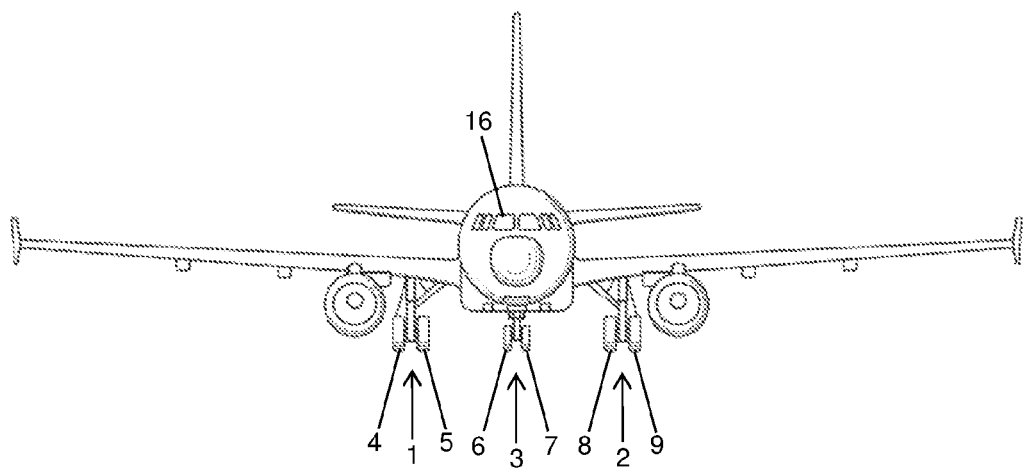
FIG. 1 shows an aircraft.
Figure 2:
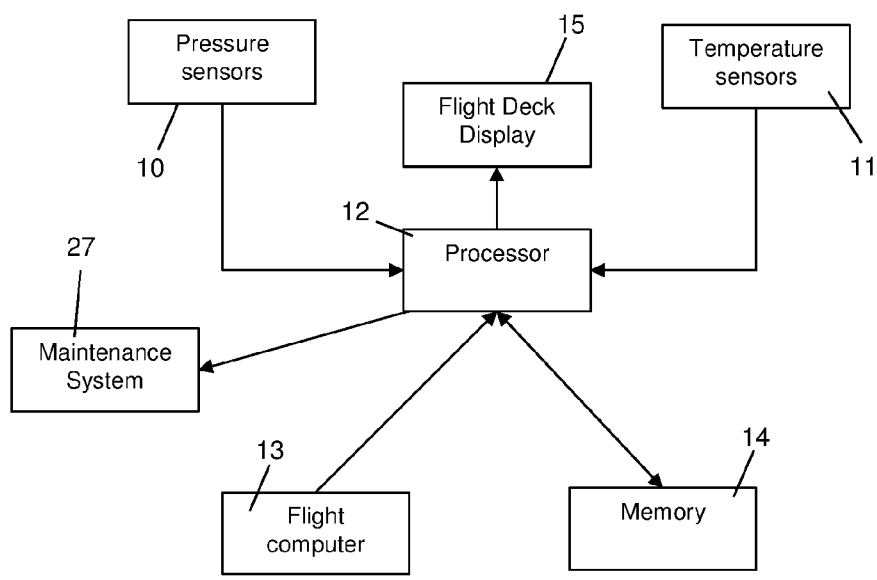
FIG. 2 shows a tire pressure monitoring system for providing pressure warnings associated with the tires of the aircraft.

FIG. 1 shows an aircraft with a pair of main landing gears 1, 2 (MLGs) and a single nose landing gear 3 (NLG). Each landing gear has a pair of tires 4-9. FIG. 2 is a schematic diagram showing a monitoring system for providing pressure warnings associated with the tires 4-9.

Each tire has an associated tire pressure sensor and temperature sensor (the pressure and temperature sensors collectively being indicated at 10, 11 respectively in FIG. 2) which provide measurements to a processor 12. The pressure sensor 10 and temperature sensor 11 on a given tire may be integrated into a single unit. Alternatively each tire may have a pressure sensor 10 but no temperature sensor 11.

The system of FIG. 1 comprises a flight deck display 15 (FIG. 2) which is located on a flight deck 16 (FIG. 1) of the aircraft in a position which is visible to flight crew during flight of the aircraft. The flight deck display 15 is used to provide critical information to flight crew during flight of the aircraft, and may also be used to provide information to maintenance crew when the aircraft is stationary.

A maintenance system 27 is also connected to the processor 12. The maintenance system 27 provides health and fault information to the maintenance crew member for servicing actions. The maintenance system 27 may be a fixed device on the flight deck 16 of the aircraft, or it may be a portable device which is brought onto the aircraft by the maintenance crew when the aircraft is undergoing maintenance on the ground. In either case the maintenance system 27 comprises a computer terminal with a display, keyboard, processor etc. Alternatively the maintenance system 27 may be remote from the aircraft, and connected to the processor 12 by a wireless link. The maintenance system 27 is used to display less safety-critical information than the flight deck display 15, so it can operate with a lower level of trustworthiness than the flight deck display 15.

Figure 3:
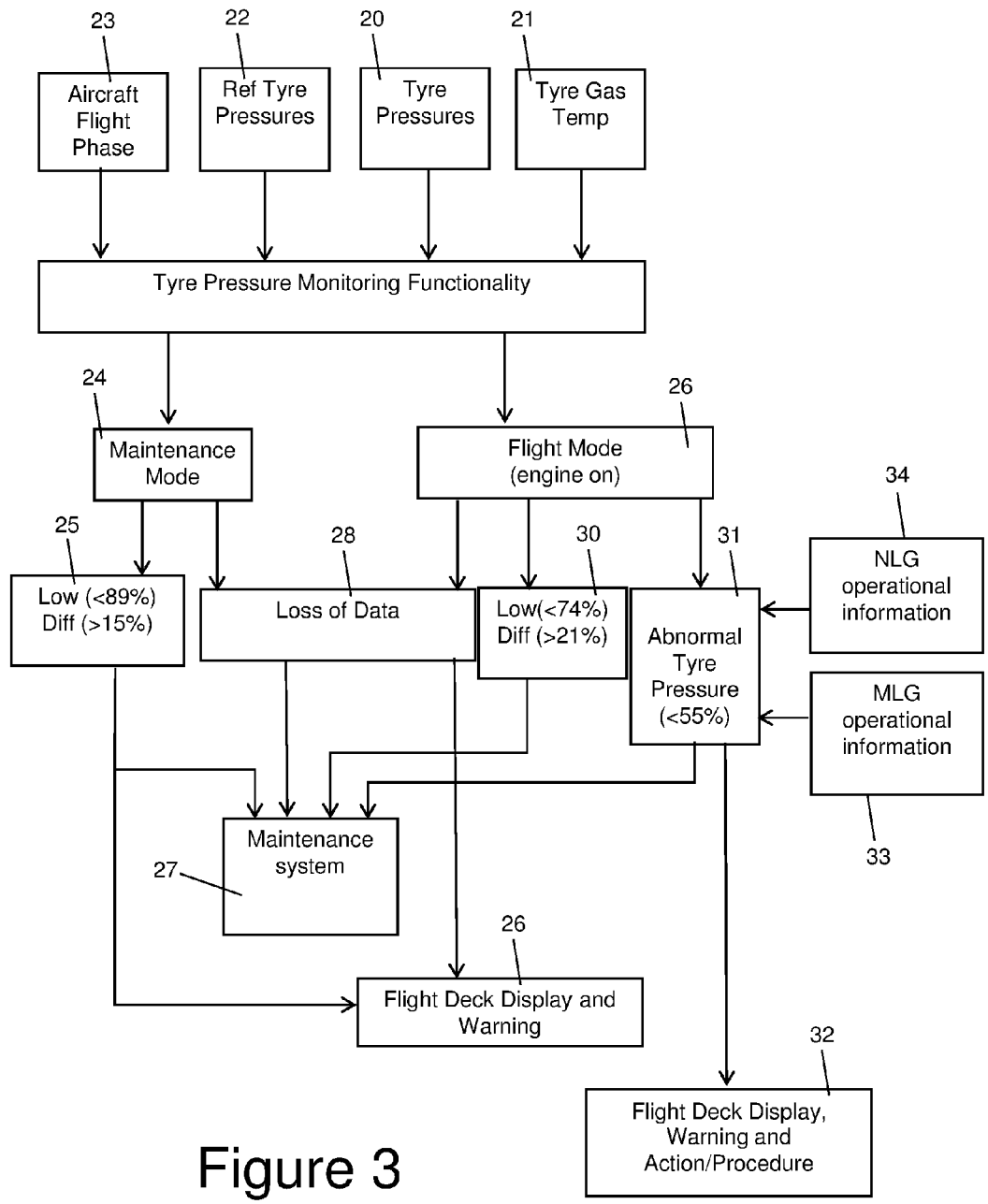
FIG. 3 shows a method of operating the tire pressure monitoring system of FIG. 2.

The processor, 12 is programmed to implement the method illustrated in FIG. 3. The processor 12 receive tire pressure measurements 20 from the pressure sensors 10 and tire gas temperature measurements 21 from the temperature sensors 11. The processor 12 also receives reference pressures 22 from memory 14, each reference pressure 22 being associated with a respective pressure sensor 10 (and hence also being associated with a respective one of the tires 4-9). The processor 12 also receives aircraft flight phase information 23 from a flight computer 13 indicating the current flight phase of the aircraft. For instance when the engines of the aircraft are started, then an "engine start" aircraft flight phase indication is sent from the flight computer 13 to the processor 12, and when the engines are stopped an "engine stop" aircraft flight phase indication is sent from the flight computer 13 to the processor 12.

The processor 12 is programmed to operate in one of two distinct modes: a maintenance mode 24 and an operational mode 26. The processor 12 switches between these two modes depending on the flight phase of the aircraft as indicated by the aircraft flight phase information 23 from the flight computer 13. In a simple example, when the processor 12 receives an "engine start" aircraft flight phase indication (which indicates that the aircraft is entering an operational flight phase) then it switches to the flight mode 26 and when the processor 12 receives an "engine stop" aircraft flight phase indication (which indicates that the aircraft is now in a maintenance phase during which the aircraft is stationary) then it switches to the maintenance mode 24.

As mentioned above, the processor 12 receives reference pressures 22 along with tire pressure measurements 20 from the pressure sensors 10. These reference pressures 22 are stored in a memory 14. By way of example, the tires 6, 7 of the NLG 3 may each have a reference pressure of X, and the tires 4,5,8,9 of the MLGs 1, 2 may each have a reference pressure of Y, which is different from X.

In the maintenance mode 24, the processor 12 is programmed to operate as follows. The processor 12 receives first tire pressure measurements 20 indicating pressures of the tires 4-9 from the pressure sensors 10, and compares them with a first threshold which will be referred to below as a maintenance mode low pressure threshold. This maintenance mode low pressure threshold may for example be 89% of the reference pressure. So the pressure measurements from the NLG 3 are compared with 0.89X, and the pressure measurements from the MLGs 1, 2 are compared with 0.89Y. If any of the first tire pressure measurements are determined to be below the maintenance mode low pressure threshold at step 25, then the processor 12 is programmed to generate a first type of warning (referred to below as a low pressure warning) which it causes to be displayed on the flight deck display 15, as well as being displayed by the maintenance system 27. Maintenance crew can therefore view the low pressure warning on either the maintenance system 27 or the flight deck display 15.

The low pressure warning may be for example text such as "WHEEL TIRE PRESSURE LOW" which is displayed along with the tire pressure measurements 20 from all tires. The low tire pressure measurements (<89%) are displayed in amber and the healthy tire pressure measurements (>=89%) are displayed in green. Each amber pressure measurement provides a low pressure warning associated with a respective tire. So for example if there are two low tire pressure measurements (<89%) for two different tires, then those two low tire pressure measurements are displayed in amber whilst the healthy tire pressure measurements (>=89%) associated with the other tires are displayed in green. An audible alarm may also sound.

The processor 12 also calculates differential pressure measurements for each axle pair (that is, for each pair of tires which share a common axle)—for example the difference between the tire pressure measurements for the two tires 4, 5 on MLG 1. If the difference exceeds a maintenance mode differential threshold (such as 15%) at step 25, then the processor 12 generates a second type of warning (referred to below as a differential pressure warning) which it causes to be displayed on the flight deck display 15 (FIG. 2). The differential pressure warning has a similar format to the low pressure warning described above.

If the processor 12 does not receive pressure or temperature measurements then it identifies a loss of data at step 28 and communicates this to the maintenance system 27 and the flight deck flight deck display 15. In response to a loss of data at 28, the maintenance system 27 notifies the maintenance crew which is then prompted to perform a manual check of tire pressures.

In the flight mode 26, the processor 12 is programmed to operate as follows. The processor 12 receives second tire pressure measurements from the pressure sensors 10 indicating pressures of the tires, and compares them with a second threshold referred to below as an abnormal pressure threshold.

This abnormal pressure threshold is lower than the maintenance mode low pressure threshold of 89%. The abnormal pressure threshold may for example be 55%. So the second pressure measurements from the NLG 3 are compared with 0.55X, and the second pressure measurements from the MLGs 1, 2 are compared with 0.55Y. If any of the second tire pressure measurements are determined to be below the abnormal pressure threshold (55%) at step 31, then the processor 12 generates a third type of warning 32 (referred to below as an abnormal pressure warning) which is displayed on the flight deck display 15. The abnormal pressure warning may be for example text such as "WHEEL TIRE PRESSURE ABNORMAL" which is displayed on the flight deck display 15 along with the tire pressure measurements 20 from all tires. The abnormal tire pressure measurements (<55%) are displayed in red and the other tire pressure measurements (>=55%) are displayed in green. Each red pressure measurement provides an abnormal pressure warning associated with a respective tire. So for example if there are two abnormal tire pressure measurements (<55%) for two different tires, then those two abnormal tire pressure measurements are displayed in red whilst the healthy tire pressure measurements (>=55%) associated with the other tires are displayed in green. An audible alarm may also sound.

When the processor is in the flight mode 26, then if a pressure measurement for a tire is between the maintenance mode low pressure threshold (89%) and the abnormal pressure threshold (55%), then the processor 12 does not cause the flight deck display 15 to display a low pressure warning associated with that tire, or any other kind of tire pressure warning associated with that tire. This ensures that the flight crew is not distracted by unnecessary low pressure warnings during operation of the aircraft. The flight crew is only provided with a warning via the flight deck display 15 if the tire pressure is dangerously low—in this case below 55%. So abnormal tire pressure measurements (<55%) are displayed in red, but all tire pressure measurements which are greater than or equal to 55% are displayed in green, including tire pressure measurements which are below the maintenance mode low pressure threshold of 89% and therefore would be displayed in amber if the processor was in the maintenance mode. So in flight mode if a tire pressure is 60% then it will be displayed in green (i.e. there is no low pressure warning associated with that tire), but in maintenance mode such a tire pressure of 60% would be displayed in amber (to provide a low pressure warning associated with that tire).

An abnormal pressure warning differs from a low pressure warning in the maintenance mode, in that it indicates not only which tire has a second pressure measurement below the abnormal pressure threshold, but also provides at least one item of operational information 33, 34 to the flight crew. For example if the aircraft is on the ground with engines on, then the operational information may comprise an instruction to stop the aircraft or return to the gate. If the aircraft is in the air, then the operational information may comprise a recommended action to be taken during or after landing. By way of example, if the abnormal pressure is on an MLG 1, 2 then the abnormal pressure warning may indicate a braking distance. Alternatively, if the abnormal pressure is on the NLG 3, then the abnormal pressure warning may indicate a maximum steering angle or a maximum taxi speed. Operational information for the MLG is indicated in FIG. 3 at 33, and for the NLG at 34.

When the processor is operating in the flight mode and a pressure measurement is below the abnormal pressure threshold, then the processor may not only cause the flight deck display 15 to display an abnormal pressure warning as described above, incorporating operational information 33, 34, but it may also provide an abnormal pressure indication to another aircraft system involved with manoeuvring the aircraft on the ground—such as the flight computer 13 or an automatic taxi device (not shown) for driving the wheels during taxi of the aircraft.

In the flight mode 26, the processor 12 is also programmed to compare the second pressure measurements with a flight mode low pressure threshold. The flight mode low pressure threshold is 74%, which is lower than the maintenance mode low pressure threshold of 89% but higher than the abnormal pressure threshold of 55%. If any of the second tire pressure measurements are determined to be below the flight mode low pressure threshold (74%) at step 30, then the processor generates a low pressure warning associated with the tire. The low pressure warning is similar to the low pressure warning described above which is generated in the maintenance mode. However, unlike in the maintenance mode 24, low pressure warnings generated in the flight mode 26 are not displayed on the flight deck display 15. Rather, they are only communicated to the maintenance system 27, which may optionally display the low pressure warning. This ensures that when the processor is in the flight mode, if a pressure measurement is at or above the abnormal pressure threshold (55%), then the processor 12 does not cause the flight deck display 15 to display a low pressure warning, or any other kind of tire pressure warning, for the tire.

If the maintenance system 27 is onboard the aircraft, then if a low pressure warning is generated during flight then the maintenance system 27 may relay this low pressure warning wirelessly to a maintenance base on the ground to notify the maintenance base in advance that maintenance action will be required once the aircraft has landed.

In the flight mode 26 the processor 12 is also programmed to calculate differential pressure measurements for each axle pair. If the difference exceeds a flight mode differential threshold at step 30, then the processor 12 generates a differential pressure warning which is sent to the maintenance system 27 for display. The flight mode differential threshold used in the flight mode 26 is 21%, higher than the maintenance mode differential threshold of 15% which is used in the maintenance mode 25. Unlike in the maintenance mode 24, differential pressure warnings generated in the flight mode 26 are not displayed on the flight deck display 15. Rather, they are only communicated to the maintenance system 27, which may optionally display the differential pressure warning.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method of operating a monitoring system to provide pressure warnings associated with a tire of an aircraft, the monitoring system comprising a flight deck display on a flight deck of the aircraft and a processor, the method comprising:
when the aircraft is stationary, operating the processor in a maintenance mode in which the processor receives a first pressure measurement indicating a pressure of the tire; compares the first pressure measurement with a maintenance mode low pressure threshold, and causes the flight deck display to display a low pressure warning associated with the tire if the first pressure measurement is below the maintenance mode low pressure threshold; and
when the aircraft is in motion, operating the processor in a flight mode in which the processor receives a second pressure measurement indicating a pressure of the tire, compares the second pressure measurement with an abnormal pressure threshold which is lower than the maintenance mode low pressure threshold, and causes the flight deck display to display an abnormal pressure warning associated with the tire if the second pressure measurement is below the abnormal pressure threshold; wherein when the processor is in the flight mode, if the second pressure measurement is between the maintenance mode low pressure threshold and the abnormal pressure threshold, then the processor does not cause the flight deck display to display a low pressure warning associated with the tire.

2. A method according to claim 1, wherein the abnormal pressure warning includes an indication that the second pressure measurement is below the abnormal pressure threshold, and also includes at least one item of operational information.

3. A method according to claim 1, wherein the processor switches between the maintenance mode and the flight mode in response to receiving flight phase information from a flight computer.

4. A method according to claim 1, wherein when the processor is in the flight mode it compares the second pressure measurement with a flight mode low pressure threshold which is between the abnormal pressure threshold and the maintenance mode low pressure threshold, and causes a maintenance system to display a low pressure warning associated with the tire if the second pressure measurement is lower than the flight mode low pressure threshold.

5. A method according to claim 1, wherein when the processor is in the maintenance mode and the first pressure measurement is below the maintenance mode low pressure threshold, then it not only causes the flight deck display to display a low pressure warning associated with the tire but also causes a maintenance system to display a low pressure warning associated with the tire.

6. A method according to claim 1, wherein when the processor is in the flight mode and the second pressure measurement is between the maintenance mode low pressure threshold and the abnormal pressure threshold, then no tire pressure warnings associated with the tire are displayed by the flight deck display.

7. A method according to claim 1, wherein when the processor is operating the processor in the flight mode and a pressure measurement is below the abnormal pressure threshold, then the processor not only causes the flight deck display to display an abnormal pressure warning associated with the tire but it also provides an abnormal pressure indication to another aircraft system.

8. A monitoring system for providing pressure warnings associated with a tire of an aircraft, the system comprising a flight deck display on a flight deck of the aircraft and a processor;
wherein the processor is programmed to operate in a maintenance mode when the aircraft is stationary and in a flight mode when the aircraft is in motion;
in the maintenance mode, the processor is programmed to compare a first pressure measurement indicating a pressure of the tire with a maintenance mode low pressure threshold, and cause the flight deck display to display a low pressure warning associated with the tire if the first pressure measurement is below the maintenance mode low pressure threshold;
in the flight mode, the processor is programmed to compare a second pressure measurement indicating a pressure of the tire with an abnormal pressure threshold which is lower than the maintenance mode low pressure threshold, and cause the flight deck display to display an abnormal pressure warning associated with the tire if the second pressure measurement is below the abnormal pressure threshold; and in the flight mode, the processor is programmed so that if the second pressure measurement is between the maintenance mode low pressure threshold, then the processor does not cause the flight deck display to display a low pressure warning associated with the tire.

9. A monitoring system according to claim 8 further comprising a pressure sensor arranged to take the first and second pressure measurements from the tire of the aircraft and provide them to the processor.

10. A monitoring system according to claim 8, wherein the abnormal pressure warning includes an indication that the second pressure measurement is below the abnormal pressure threshold, and also includes at least one item of operational information.

11. A monitoring system according to claim 8 further comprising a maintenance system, wherein when the processor is in the maintenance mode and the first pressure measurement is below the maintenance mode low pressure threshold, then the processor is programmed to not only cause the flight deck display to display a low pressure warning associated with the tire but also to cause the maintenance system to display a low pressure warning associated with the tire.

12. A monitoring system according to claim 8, wherein the processor is programmed so that when the processor is operating in the flight mode and a pressure measurement is below the abnormal pressure threshold, then the processor not only causes the flight deck display to display an abnormal pressure warning associated with the tire but it also provides an abnormal pressure indication to another aircraft system.

13. An aircraft comprising a tire, and a monitoring system for providing pressure warnings associated with the tire, the monitoring system comprising a flight deck display on a flight deck of the aircraft and a processor;

wherein the processor is programmed to operate in a maintenance mode when the aircraft is stationary and in a flight mode when the aircraft is in motion;

in the maintenance mode, the processor is programmed to compare a first pressure measurement indicating a pressure of the tire with a maintenance mode low pressure threshold, and cause the flight deck display to display a low pressure warning associated with the tire if the first pressure measurement is below the maintenance mode low pressure threshold;

in the flight mode, the processor is programmed to compare a second pressure measurement indicating a pressure of the tire with an abnormal pressure threshold which is lower than the maintenance mode low pressure threshold, and cause the flight deck display to display an abnormal pressure warning associated with the tire if the second pressure measurement is below the abnormal pressure threshold; and in the flight mode, the processor is programmed so that if the second pressure measurement is between the maintenance mode low pressure threshold, then the processor does not cause the flight deck display to display a low pressure warning associated with the tire.

14. A method using a monitoring system configured to monitor a pressure of a tire on an aircraft, wherein the method comprises:

the monitoring system selects a first tire pressure threshold in response to a signal indicating the aircraft is stationary and selects a second tire pressure threshold in response to a signal indicating that the aircraft is moving, wherein the second tire pressure threshold represents a tire pressure lower than a tire pressure represented by the first tire pressure threshold;

the monitoring system repeatedly receives a pressure signal indicating a pressure in a tire of the aircraft;

the monitoring system compares the pressure signal to the selected one of the first or second tire pressure thresholds depending on whether the aircraft is stationary or moving, generates a low pressure warning associated with the tire if the pressure in the tire as indicated by the pressure signal is below the selected one of the first or second pressure thresholds, wherein the monitoring system does not generate a low pressure warning corresponding to the tire while the aircraft is moving if the pressure in the tire is above the second low pressure warning, and transmitting the low pressure warning to be shown on a display in a flight deck of the aircraft.

15. The method of claim 14 wherein the monitoring system automatically selects the first or second tire pressure threshold, generates the low pressure warning and transmits the low pressure warning to the display.

\* \* \* \* \*